Patented June 19, 1945

2,378,573

UNITED STATES PATENT OFFICE 2,378,573

PROCESS FOR THE MANUFACTURE OF KETO-ALCOHOLS

Giulio Natta, Milan, Italy; vested in the Alien Property Custodian

No Drawing. Application June 12, 1940, Serial No. 340,225. In Italy July 8, 1939

3 Claims. (Cl. 260—594)

It is known that by reacting ketones with formaldehyde, keto-alcohols may be obtained but heretofore high yields and pure products have not been obtained.

It is found that due to condensation in the presence of basic substances, products other than keto-alcohols are formed, i. e. from acetone are obtained diacetone-alcohol, phorone and homologues, formoses and further products of condensation or resinification. In order to reduce formation of resins, it has been suggested to operate in the presence of a great excess of ketone, but in such conditions the formation of products of polymerization of ketones and other secondary reactions can not completely be avoided.

By the present invention it is possible to obtain keto alcohols with a high yield. For example, starting from acetone, keto-butanol 3.1 (known also under the name of acetoethyl-alcohol or methyloxy ethylketone)

may be obtained with a practically quantitative yield. The same process, when effected with the use of a large proportion of formaldehyde as hereinafter disclosed, yields methylene ketobutanol (2 methylene-3.1.ketobutanol)

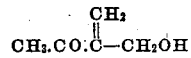

instead of ketobutanol 3.1.

The process is performed by employing a dilute aqueous solution of ketone and formaldehyde in the presence of a given concentration of hydrogen ions and operating within a certain range of temperature.

The pH of the solution, during the condensation, must be kept below 10 and preferably between 8 and 9. For lower concentrations of hydrogen ions secondary reactions are developed; while for higher concentrations the reaction becomes very slow.

The temperature must be kept below 50° C. and when it is desired to obtain only keto-butanol, with condensation of acetone with formaldehyde it is convenient that the temperature be kept between 25° C. and 32° C., while it may preferably be kept between 30° C. and 40° C. when it is desired to obtain methyleneketobutanol.

Under these conditions it is possible to operate with equimolecular concentrations of acetone and formaldehyde as 1:1, but a slight excess of acetone is not harmful as it may be completely recovered. Even when operating with equimolecular concentrations secondary reactions are practically eliminated. In the presence of an excess of formaldehyde up to a proportion of 2 molecules to 1 molecule of acetone and at slightly higher temperatures, the reaction proceeds with formation of methyleneketobutanol, but also under these conditions the formation of resins and other secondary reactions is eliminated.

The concentration of the aqueous solution of acetone may vary within broad limits and e. g. it may range between 30% to 70% when operating with a solution of formaldehyde at 30%+40%. It could also be possible to operate with more diluted solutions but practically, in order to shorten the time of reaction, it is convenient to operate with a concentration of acetone of about 50%.

Of no importance is the nature of the condensation medium (soda, potash, magnesia, lime, borax, etc.), provided that substances which do not readily react with aldehyde and acetone be used and the pH value lies between the above mentioned limits.

The speed of reaction depends exclusively on the concentration of hydroxyl ions and on the temperature; when operating with a pH between 8.5+9 and at 30° C., the reaction is completed in about 4 hours.

By slightly increasing the temperature, the reaction is more rapid but small quantities of methyleneketobutanol are formed. Methyleneketobutanol is prevalent also when an excess of formaldehyde is used.

When condensation is completed the solution is neutralised and the separation by distillation of ketoalcohols from water may be carried out. After elimination of water, vacuum distillation may be effected and e. g. ketobutanol and methyleneketobutanol completely distil without leaving any residue.

Without further treatment and purification the neutral or acid solution of ketobutanol and methyleneketobutanol may be hydrogenated into butyleneglycol 1.3 and 2. methylbutyleneglycol 1.3 respectively.

The mentioned process may be of importance in the manufacture of synthetic rubber for the fact that butyleneglycol 1.3 gives, by dehydration, as known, butadiene and methylbutyleneglycol gives, even by dehydration, isoprene.

The same processes may also be of interest in the manufacture of explosives for the fact that glycols obtained by reduction of ketoalcohols may give by nitration nitric esters which possess very interesting properties as explosives.

Other higher ketoalcohols supply the corresponding glycols.

What I claim is:

1. A process for the manufacture of a mixture of keto-butanol 3.1 and 2 methylene keto-butanol 3.1 consisting in condensing acetone at a temperature below 50° C. with a dilute aqueous solution of formaldehyde the hydrogen ion concentration of which corresponds to a pH value between 8 and 9, the molecular ratio being 2:1.

2. A process for the manufacture of keto-butanol 3.1 consisting in condensing acetone at a temperature between 25° and 32° C. with formaldehyde in dilute aqueous solution having a pH value between 8 and 9, the molecular ratio being 1:1.

3. A process for the manufacture of 2 methylene keto-butanol 3.1 consisting in condensing acetone at a temperature below 50° C. with formaldehyde in dilute aqueous solution of pH value between 8 and 9, the proportions being between 2 molecules of formaldehyde to 1 molecule of acetone.

GIULIO NATTA.